(12) United States Patent
Simkowski

(10) Patent No.: US 6,279,729 B1
(45) Date of Patent: Aug. 28, 2001

(54) ARTICLE CONVEYANCE HAVING MECHANICAL DRIVE

(75) Inventor: Donald J. Simkowski, Loveland, CO (US)

(73) Assignee: Goldco Industries, Inc., Loveland, CO (US)

( * ) Notice: Subject to any disclaimer, the term of this patent is extended or adjusted under 35 U.S.C. 154(b) by 0 days.

(21) Appl. No.: 09/419,342

(22) Filed: Oct. 15, 1999

(51) Int. Cl.[7] .................................................. B65G 17/32
(52) U.S. Cl. ......................................... 198/626.1; 198/681
(58) Field of Search .............................. 198/465.4, 681, 198/817, 626.1

(56) References Cited

U.S. PATENT DOCUMENTS

| | | |
|---|---|---|
| 3,122,234 | 2/1964 | Kagley . |
| 3,289,867 | 12/1966 | Burke . |
| 3,850,284 | 11/1974 | Roberts . |
| 3,934,993 | 1/1976 | Bowman et al. . |
| 4,114,347 | 9/1978 | Morris et al. . |
| 4,284,370 | 8/1981 | Danler et al. . |
| 4,479,574 | 10/1984 | Julius et al. . |
| 4,556,143 | 12/1985 | Johnson . |
| 4,802,571 | 2/1989 | Born et al. . |
| 4,823,940 | 4/1989 | Cretser . |
| 4,836,359 | 6/1989 | Walter . |
| 4,840,268 | 6/1989 | Zemek . |
| 4,874,081 | 10/1989 | Kondo . |
| 5,029,696 | * 7/1991 | Van Tilburg ..................... 198/626.1 |
| 5,038,919 | 8/1991 | Harston . |
| 5,511,651 | 4/1996 | Barth . |
| 5,553,698 | 9/1996 | Patois et al. . |
| 5,630,679 | 5/1997 | Simkowski et al. . |
| 5,871,325 | 2/1999 | Schmidt et al. . |
| 5,937,998 | 8/1999 | Priero . |
| 6,131,724 | * 10/2000 | Hirasawatu et al. .......... 198/626.1 X |

* cited by examiner

Primary Examiner—James R. Bidwell
(74) Attorney, Agent, or Firm—Robert E. Harris

(57) ABSTRACT

Apparatus for conveying articles, particularly articles such as containers, or bottles, having a neck portion with a neck ring thereon, along an article conveying path with the articles being urged along the article conveying path by article engaging members extending from a plurality of sections of an elongated movable member that extends along a second path adjacent and horizontally offset from the article conveying path. The elongated movable member is preferably a chain having a plurality of links each with a body portion and vertically spaced end portions shaped such that the links are connectable to one another in a manner enabling limited angular deviation of the chain during normal operation, and article engagement preferably includes a flange that extends horizontally from the lower end of each chain link into the article conveying path to engage the lower edge of the neck ring of articles in the article conveying path so that the articles are urged along the article conveying path upon movement of the chain unit along the second path.

20 Claims, 3 Drawing Sheets

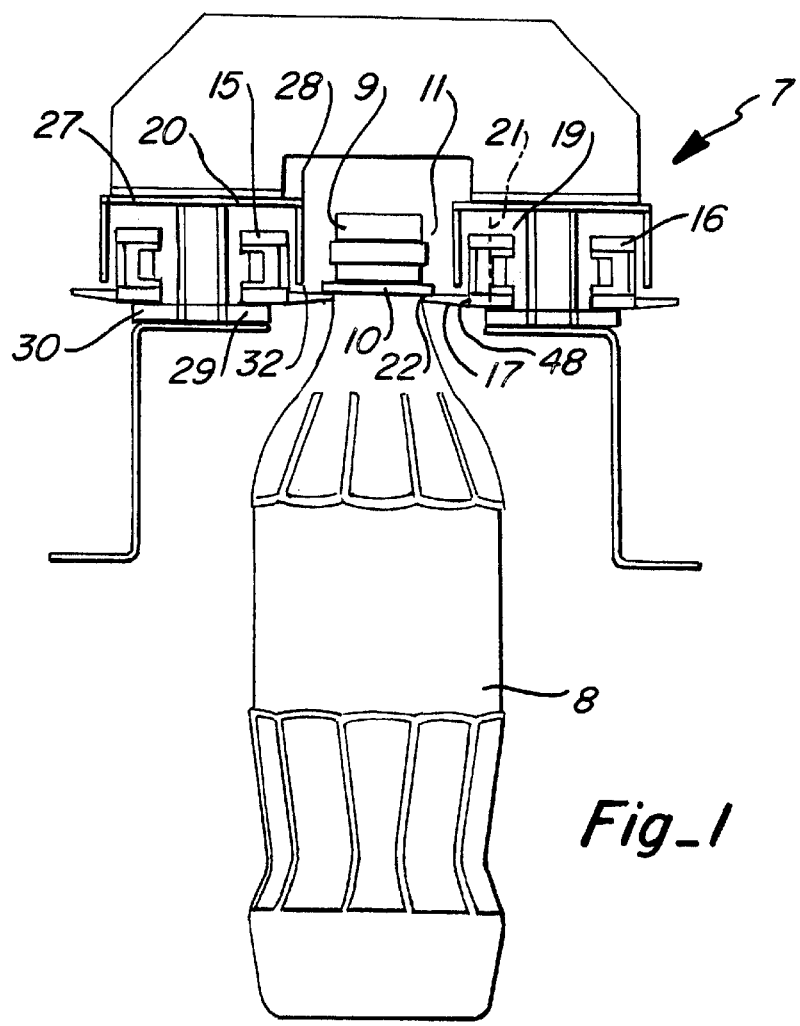
Fig_1
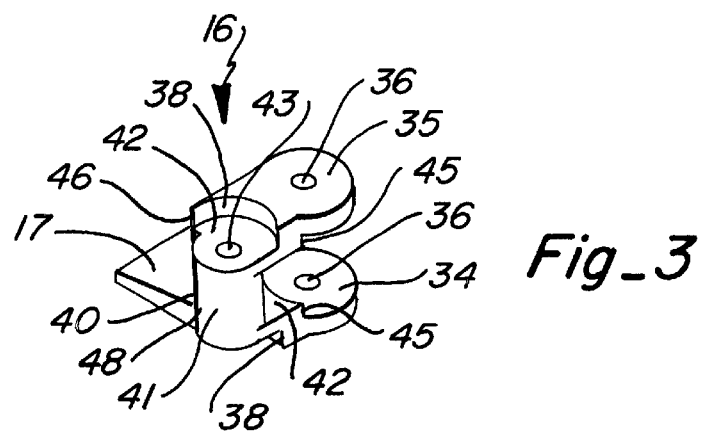
Fig_3

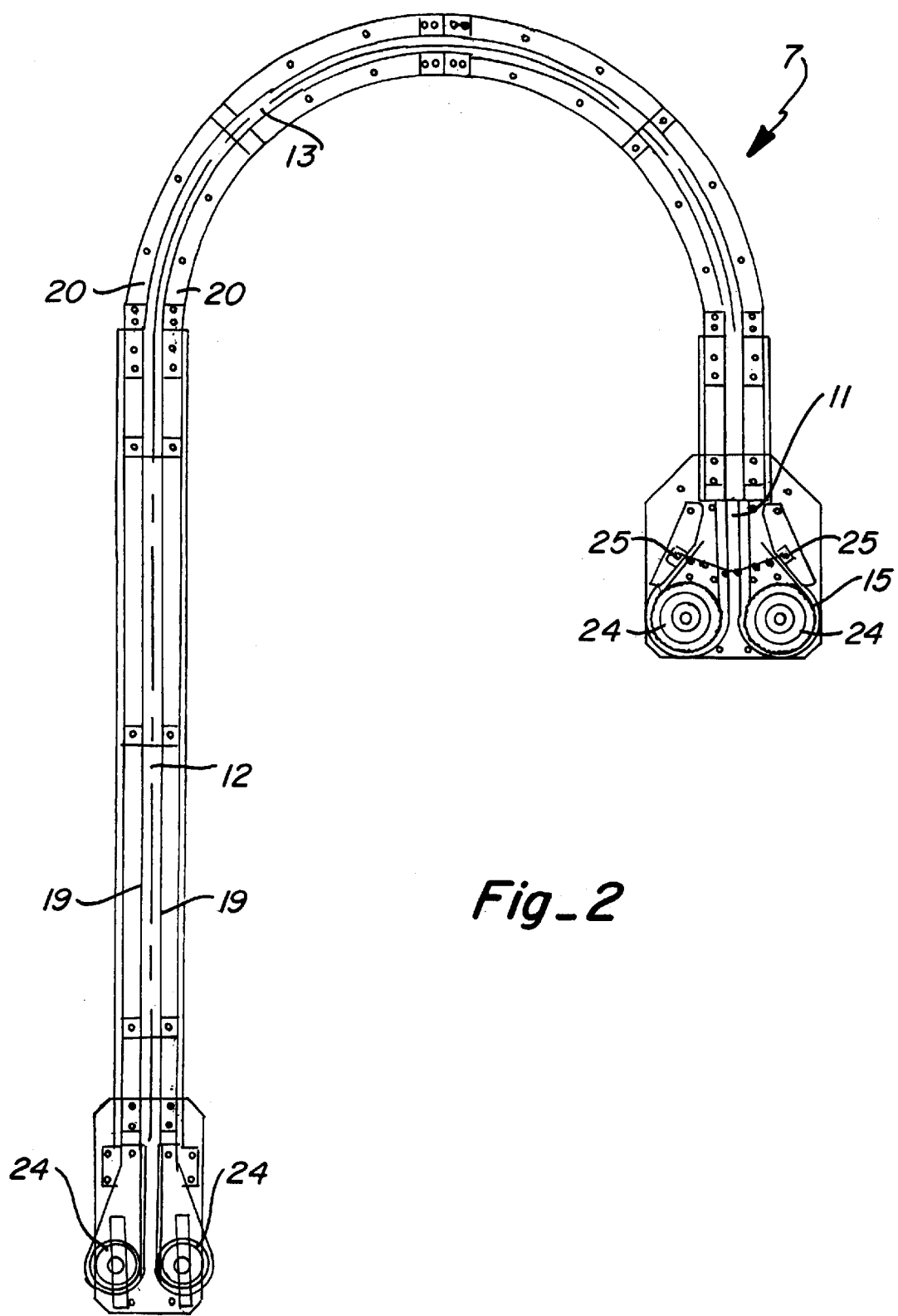
Fig_2

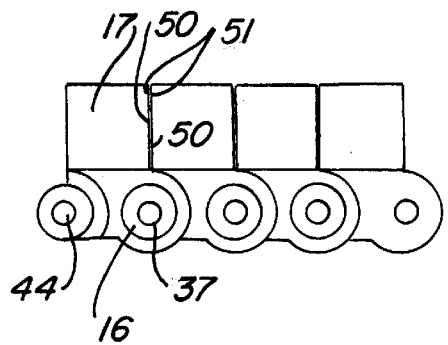
Fig_4
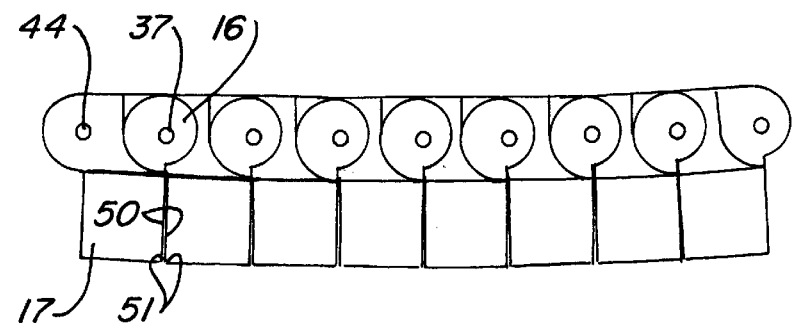
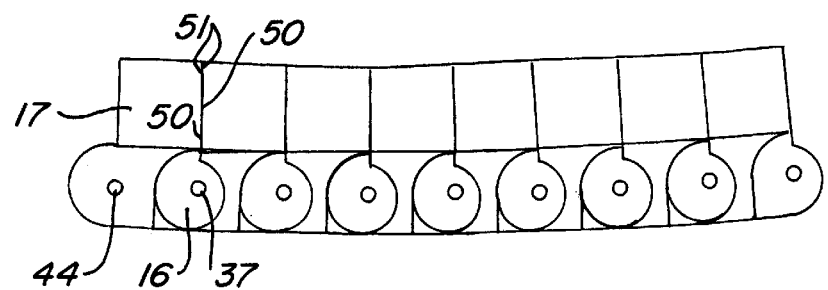
Fig_5 though this need not be the case, with such a neighboring pair of links being as depicted in FIG. 5, for example.

ARTICLE CONVEYANCE HAVING MECHANICAL DRIVE

FIELD OF THE INVENTION

This invention relates to article conveyance, and, more particularly, relates to apparatus for article conveyance having mechanical drive for urging articles along a conveying path, and, still more particularly, relates to apparatus for mechanically conveying articles having a neck portion with a neck ring thereon.

BACKGROUND OF THE INVENTION

It is oftentimes necessary to convey articles, such as, for example, containers, between different locations, such as, again by way of example, moving bottles having a neck portion with a neck ring thereon, from one location, or position, to another in connection with manufacture, processing, storage, and/or filling of the bottles.

While articles may sometimes simply be moved in single line, or file, between locations, it is sometimes necessary, or at least preferable, that unstable articles such as containers having a neck portion with a neck ring thereon, be supported during conveyance by engaging members that engage the lower protruding edge of the neck ring, with the thus supported articles being moved along an article conveying path either by air urging the articles along the path with the articles sliding along fixed position engaging members, as shown for example, in U.S. Pat. No. 4,284,370 (Danler et al.) and U.S. Pat. No. 5,630,679 (Simkowski et al.), or by causing the engaging members to be moved along the article conveying path to thereby urge the articles along the article conveying path due to frictional engagement between the articles and the article engaging members, as shown for example, in U.S. Pat. No. 4,802,571 (Born et al.), U.S. Pat. No. 4,874,081 (Konko), U.S. Pat. No. 5,553,698 (Patois et al.), and U.S. Pat. No. 5,937,998 (Priero).

Particular difficulty has heretofore been encountered, however, in handling some types of articles during conveyance, including, for example, unstable articles supported during conveyance by engagement with neck rings on the articles, and this invention is particularly directed to improvement of such conveyance.

SUMMARY OF THE INVENTION

This invention provides improved apparatus for article conveyance by providing better and/or more efficient article contact during conveyance and/or by providing greater conveyance flexibility, including the ability to provide deviations, or turns, in the conveying path.

It is therefore an object of this invention to provide improved article conveying apparatus.

It is another object of this invention to provide improved article conveying apparatus capable of better and/or more efficient article contact during conveyance.

It is another object of this invention to provide improved article conveying apparatus having improved conveyance flexibility, including enabling deviations, or turns, in the article conveying path.

It is another object of this invention to provide improved article conveying apparatus that includes an elongated member with a plurality sections each of which has an article engaging member extending into an article conveying path for engaging articles and urging engaged articles along the path.

It is another object of this invention to provide improved apparatus that includes a chain having a plurality of shaped links and a flange extending therefrom for engaging articles to be conveyed along an article conveying path to urge movement of the articles along the article conveying path.

With these and other objects in view, which will become apparent to one skilled in the art as the description proceeds, this invention resides in the novel construction, combination, and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a simplified cut-away side view of apparatus for conveying articles according to this invention;

FIG. 2 is a top view of the apparatus illustrated in FIG. 1;

FIG. 3 is a perspective view of a link of the chain illustrated in FIG. 1;

FIG. 4 is a top view illustrating a plurality of connected adjacent links of chain, each as shown in FIG. 3, and also illustrating relative positioning of the flanges extending from adjacent links of a straight chain run; and FIG. 5 is a top view illustrating a plurality of connected adjacent links of chain, similar to that shown in FIG. 4, but illustrating relative positioning of the flanges during an angular deviation, or turn, in the chain run.

DESCRIPTION OF THE INVENTION

As shown in FIG. 1, apparatus 7, according to this invention, conveys articles 8, shown in FIG. 1 to be plastic bottles having a neck portion 9 with a protruding neck ring 10 thereon, along article conveying path 11. As indicated in FIG. 2, the articles may be conveyed along a straight path, or run, 12, but may also be conveyed along a path, or run 13 having an angular deviation, or turn, therein.

While the article conveying path is often near horizontal (with some deviation therefrom being meant to be included in the term "horizontal as used herein), it is sometimes necessary, or desirable, to convey the articles along an inclined and/or declined path (with an incline or decline of up to, or exceeding, about ten degrees having been found to be acceptable), and this invention is also meant to include such conveyance.

In addition, while articles 8 have been specifically illustrated in the drawings as bottles having a neck portion with a neck ring thereon, it is meant to be realized that other types of articles might also be conveyed by apparatus according to this invention, including, for example, other types of containers, so long as the articles to be conveyed are sufficiently light in weight and configured to be acted upon in the same manner as shown and described herein.

As best shown in FIGS. 1 and 2, apparatus 7 conveys articles 8 in single line, or file, between locations, as needed and/or desired, with the articles being mechanically urged, or driven, by an elongated member 15, illustrated in the drawings as a chain, having a plurality of sections 16, illustrated in the drawings as chain links.

Each section, or link, has an article engaging member 17, illustrated in the drawings as a flange, extending therefrom into article conveying path 11 to engage, or contact, articles 8 thereat and urge the articles along the article conveying path, due to frictional engagement between the articles and the article engaging element, or flange, upon movement of the elongated member, or chain, along a separate path 19 established by elongated member, or chain, guide 20, with such an arrangement also enabling accumulation of articles on the article conveying path where needed, or desired, without requiring termination or disruption of movement of the elongated member, or chain, along the elongated member, or chain, path.

As best illustrated in FIG. 1, and as is now common in conveying articles with a protruding neck ring, the article engaging members, or flanges, 17 engage the lower, or bottom, surface, or edge, 22 of the articles to effect urging of the articles along the article conveying path.

As best illustrated in FIGS. 1 and 2, and as is also now common in conveying articles, separate elongated member, or chain, paths 19 are normally established at opposite sides of article conveying path 11 with article engaging members, or flanges, 17 engaging opposite sides of the articles to urge the articles along article conveying path 11.

While not specifically shown herein, it is meant to be realized that some articles, or some specific applications, could utilize a single elongated member, or chain, driving article engaging members, or flanges, that engage only one side of the articles to be conveyed, with a ledge, or the like, being provided at the opposite side of the article. It is also meant to be realized that the elongated member might, for some applications, be other than a chain, and could be, for example, a belt, so long as the elongated article utilized is fully equivalent to a chain as specifically set forth in this specification.

As best illustrated in FIGS. 1 and 2, guides 20 (conventionally mounted on support structure, not shown) establish each elongated member, or chain, path 19, and each such path extends along article conveying path 11 (article conveying path 11 is actually established by the article engaging members, or flanges, 17) so that when the elongated member, or chain, path 19 extends horizontally, article conveying path 11 also extends horizontally but is horizontally offset from the elongated member, or chain path 19 whereby articles 8 conveyed along the article conveying path have a portion (neck portion 9 as illustrated in FIG. 1) that is adjacent to and horizontally offset from the elongated member, or chain, path.

The major axis 21 of each of sections, or links, 16 of the elongated members, or chain, extend in a direction normal (i.e., perpendicular) to the direction of elongated member, or chain, path 19. As illustrated in FIG. 1, when elongated member, or chain, path 19 is horizontal, then the major axis of sections, or links, 16 extends vertically. This positioning of chain 15 is shown in FIG. 1 to be effected by chain guide 20 with guide 20 substantially surrounding, or enclosing, chain 15.

As indicated in FIGS. 1 and 2, chain 15 is preferably an endless chain that extends around sprockets 24, may utilize chain tighteners, or positioners, 25, and may be conventionally driven by a motor (not shown) that rotates one or more sprockets to cause movement of the chain along the chain path. As indicated in FIGS. 1 and 2, separate endless chains are utilized at opposite sides of the article conveying path when urging movement of the articles along the article conveying path from both sides thereof.

Guide 20 is preferably formed as a two piece guide with upper portion 27 having side and top walls 28 (upper guide portion 27 may be an elongated U-shaped channel) and lower portion 29 having bottom wall 30 conventionally fastened to upper portion 27 using a bolt or the like.

Guide 20 has an elongated aperture, or opening, 32 provided at, or below, the lower portion of one side wall 28 that extends along the entire side wall to enable flanges 17 to extend from each link 16 of chain 15 into article conveying path 11.

As best shown in FIG. 3, each link 16 of chain 15 has a pair of end plates, or ears, 34 and 35 that extend in a plane parallel to the direction of chain movement (i.e., horizontal when the direction of chain movement is horizontal) with plates 34 and 35 being spaced from one another along the major axis of each link (i.e., vertically spaced when the direction of article movement is horizontal), with apertures 36 therein to receive linking pins 37 (as indicated in FIGS. 4 and 5) between end plates 34 and 35, and with plates 34 and 35 having contoured edge, or side, portions 38.

Each link 16 also has a body portion 40 that includes a cylindrical portion 41 that extends in a direction normal to the direction of chain path 19 (i.e., extends vertically when chain path 19 extends horizontally). End plates, or ears, 42 are at opposite ends of cylindrical portion 41 and extend in a plane normal to cylindrical portion 41 (i.e., are horizontally positioned when cylindrical portion 41 is vertically positioned), with cylindrical portion 41 and plates 42 having apertures 43 therethrough for receiving linking pin 44 (as indicated in FIGS. 4 and 5).

End plates 42 also extend under end plates 34 and 35 for connection to end plates 34 and 35 thereat, with end plates 42 having edge, or side, portions 45 (i.e., vertically extending when end plates 42 are horizontally positioned) that are offset from end plates 34 and 35, and each link also has a wall 46 that extends between end plates 34 and 35 and cylindrical portion 41 at the side of the link from which flange 17 extends for strengthening the link.

As best shown in FIGS. 1 and 3, flange 17 extends from lower end portion 48 (and therefore from end plate 34 and from the bottom of wall 46) of each link 16 in a direction normal to both chain path 19 and the major axis of link 16 (i.e., each flange 17 extends horizontally from each link 16 and from wall 46 when chain path 19 extends horizontally) to engage articles on article conveying path 11.

As indicated in FIGS. 4 and 5, when links 16 are connected, or joined, by linking pins 37 and 44, to form endless chain 15, adjacent links have the cylindrical portion of one link received between end plates 34 and 35 of an adjacent link with contoured, or shaped, side edges 38 of each of end plates 34 and 35 of adjacent links, as well as side edges 45 adjacent to cylindrical portion 41 of adjacent links, permitting rotation of each link with respect to each adjacent link in the chain.

With adjacent links joined to form an endless chain, flanges 17 of adjacent links extending into article conveying path 11 are contiguous to one another, as indicated in FIGS. 4 and 5, to virtually form a movable continuous support for engaging articles in the article conveying path and urge the articles along the path.

As indicated in FIG. 4, during a straight run 12 of the chain, flanges 17 extend substantially parallel with respect to one another into the article conveying path with substantially equal small spacing between adjacent edges 50 of each of the flanges.

As indicated in FIG. 5, angular deviations, or turns, in article conveying path 11 are enabled since adjacent links of the chain can be rotated with respect to one another to a degree sufficient to allow angular deviation of chain path 19.

To effect such angular deviations, or turns, the walls of guide 20 are bent, or rotated, as necessary, including, if needed, notching the walls to achieve the needed path deviation.

As also indicated in FIG. 5, with dual chains utilized at opposite sides of an angular deviating path run 13 in the article conveying path, flanges 17 at one side of the article conveying path are angularly deviated, or rotated, in one direction so that adjacent flanges have an increased spacing at outer edges 51 of adjacent flange edges 50, while flanges 17 at the opposite side of the article conveying path are angularly deviated, or rotated, in the opposite direction so that adjacent flanges have a decreased spacing at outer edges 51 of adjacent flange edges 50.

In a working embodiment of this invention, it has been found that a spacing of about 0.020 inches when parallel with a maximum increase and/or decrease in spacing of about 0.010 inches for turns results in about a 24 inch turning radius.

It has also been found in a working embodiment of this invention that use of dissimilar material for the chain and chain guide is preferred, with use of dissimilar polymer materials being now preferred, including, for example, Acetal for the chain and oil impregnated ultra high molecular weight (UHMW) polymer for the chain guide.

As can be appreciated from the foregoing, this invention provides improved apparatus for efficiently conveying articles, such as, for example, containers such as bottles having a neck portion with a neck ring thereon.

What is claimed is:

1. An article conveying apparatus, comprising:
   an elongated member movable in a first direction along a first path, said elongated member having a plurality of sections each of which includes first and second end portions and a body portion connected with said first and second end portions with said sections of said elongated member having a major axis that extends in a second direction normal with respect to said first direction with said first and second end portions spaced from one another along said major axis;
   a guide member receiving said elongated member therein, said guide member having a rectangular shape with first and second guide walls parallel to one another and third and fourth guide walls parallel to one another with said guide walls extending in said first direction and defining said first path, said first guide wall having an opening therein extending along said first guide wall in said first direction; and
   a plurality of article engaging members each connected with a different one of said first end portions of said plurality of sections of said elongated member and when in said guide member extending therefrom through said opening in said first guide wall in a third direction normal to both said first and second directions to engage the articles at a second path adjacent to and extending along said first guide wall of said guide member with at least a portion of each of the articles engaged in said second path by said article engaging members being adjacent to and spaced from said first path in said third direction, and with adjacent ones of said plurality of article engaging members being contiguous to one another for supporting and urging the articles along said second path upon movement of said elongated member along said first path.

2. The apparatus of claim 1 wherein said first and second end portions of said plurality of sections of said elongated member have flat surfaces that are parallel and adjacent to different ones of said third and fourth guide walls of said guide member, and wherein each of said first end portions of said plurality of sections of said elongated member has a different one of said plurality of article engaging members thereat adjacent to said flat surface of said first end portion with said article engaging member when in said guide member extending therefrom through said opening in said first guide wall.

3. The apparatus of claim 1 wherein said guide walls of said guide member effectively enclose said elongated member when in said guide member with said different ones of said plurality of article engaging members extending through said opening in said first guide wall.

4. The apparatus of claim 1 wherein said elongated member includes a wall extending between said first and second end portions and said body portion of each of said plurality of sections so that said article engaging members when in said guide member extend from different ones of said first end portions and said wall of said elongated member through said opening in said first guide wall into said second path for engaging articles thereat.

5. An article conveying apparatus, comprising:
   an elongated member movable in a first direction along a first path, said elongated member having a plurality of sections each of which includes first and second end portions and a body portion connected with said first and second end portions with said sections of said elongated member having a major axis that extends in a second direction normal with respect to said first direction with said first and second end portions spaced from one another along said major axis; and
   a plurality of article engaging members each connected with a different one of said first end portions of said plurality of sections of said elongated member and extending therefrom in a third direction normal to both said first and second directions to engage the articles at a second path with at least a portion of each of the articles engaged in said second path by said article engaging members being adjacent to and spaced from said first path in said third direction, and with adjacent ones of said plurality of article engaging members being at least partially spaced from one another for supporting and urging the articles along said second path upon movement of said elongated member along said first path, each of said plurality of sections of said elongated member being shaped to enable angular deviation between said spaced adjacent ones of said article engaging members in opposite directions toward and away from one another to thereby allow angular deviation of said first and second paths in either one of said opposite directions.

6. An article conveying apparatus, comprising:
   a chain movable in a first direction along a first path, said chain having a plurality of links each of which includes first and second end portions and a body portion connected with said first and second end portions with said links of said chain having a major axis that extends in a second direction normal with respect to said first direction with said first and second end portions spaced from one another along said major axis;
   a chain guide receiving said chain therein, said chain guide having a rectangular shape with first and second guide walls parallel to one another and third and fourth guide wall parallel to one another with said guide walls extending in said first direction and defining said first path, said first guide wall having an opening therein extending along said first guide wall in said first direction; and a plurality of flanges each connected with a different one of said first end portions of said plurality of links of said chain and when in said chain guide extending from said links of said chain through said opening in said first guide wall in a third direction normal to both said first and second directions to engage the articles at a second path adjacent to and extending along said first guide wall of said chain guide with at least a portion of each of the articles engaged in said second path by said flanges being adjacent to and spaced from said first path in said third direction, and with adjacent ones of said plurality of flanges being contiguous to one another for supporting and urging the articles along said second path upon movement of said chain along said first path.

7. The apparatus of claim 6 wherein said first and second end portions of said plurality of links of said chain are apertured and shaped to enable adjacent links of said chain to be joined, wherein said body portion of said plurality of links of said chain includes an apertured cylindrical portion, wherein said chain includes linking pins for linking adjacent links with each said linking pin passing through said apertured first and second end portions of one link and said apertured cylindrical portion of an adjacent link, wherein each of said plurality of links of said chain has a wall extending between said first and second end portions and said cylindrical portion of said body portion with said wall, said first and second end portions, and said cylindrical portion of said body portion being effectively enclosed by said guide walls when in said chain guide, wherein one end of said wall of each said link is adjacent to said first end portion at each of said plurality of links, and wherein each of said flanges when in said chain guide extends from said one end of a different one of said walls of said links through said opening in said first guide wall into said second path.

8. The apparatus of claim 6 wherein said first and second end portions of each of said plurality of links of said chain have first plates and said body portion of each of said plurality of links includes second plates with said first and second plates being parallel with respect to said third and fourth guide walls of said chain guide, and with said flanges when in said chain guide extending from different ones of said first plates through said opening in said first guide wall into said second path.

9. The apparatus of claim 6 wherein said guide walls of said chain guide effectively enclose said chain when in said chain guide with said opening in said first guide wall of said chain guide enabling said flanges to extend from said links of said chain into said second path.

10. The apparatus of claim 6 wherein said chain and chain guide are of dissimilar polymer materials.

11. The apparatus of claim 1 wherein said plurality of article engaging members engage the articles to be conveyed at one side thereof, wherein said apparatus includes second ones of said elongated member, said guide member, and said plurality of article engaging members with said second plurality of article engaging members engaging the articles at the side thereof opposite to that of engagement of the articles by said plurality of article engaging members.

12. The apparatus of claim 5 wherein said apparatus includes second ones of said elongated member and said plurality of article engaging members with said second plurality of article engaging members engaging the articles at the side thereof opposite to that of engagement of the articles by said plurality of article engaging members, and wherein said angular path deviation of said second elongated member occurs due to angular deviation of said adjacent ones of said second plurality of article engaging members in said direction opposite to that of said angular deviation of said adjacent ones of said plurality of article engaging members whereby said angular deviation of said elongated member and said second elongated member are in opposite directions to thereby enable angular deviation of the articles in said second path positioned between said plurality of article engaging members and said second plurality of article engaging members.

13. An article conveying apparatus, comprising:
a chain movable along a first path, said chain having a plurality of links each of which includes first and second apertured end portions to receive a first linking pin therebetween and an apertured body portion offset from said first and second end portions to receive a second linking pin therethrough; and
a plurality of flanges each connected with a different one of said first end portion of each of said plurality of links of said chain so that said flanges extend into a second path for engagement of articles thereat with said flanges of adjacent links being at least partially spaced from one another to support and urge the engaged articles in a straight path along said second path upon movement of said chain in a straight path along said first path, and to support and urge the articles in a curved path along said second path upon movement of said chain in a curved path along said first path with angular deviation between adjacent ones of said flanges in opposite directions toward and away from one another causing said first path to be curved in either one of said opposite directions depending upon the desired direction of curvature of said first and second paths.

14. The apparatus of claim 13 wherein said first and second portions of adjacent links of said chain have curved abutting walls to facilitate said angular deviation between adjacent ones of said flanges.

15. The apparatus of claim 14 wherein said body portion of each of said chain links includes an apertured cylindrical portion offset from said first and second end portions, and wherein contoured plates are provided at the opposite ends of each of said apertured cylindrical portions with each of said contoured plates having a first portion with contoured side edges and a second portion extending to said first and second end portions of said links to further facilitate said angular deviation between said flanges of adjacent links of said chain.

16. The apparatus of claim 13 wherein said maximum amount of angular deviation between said flanges of said adjacent links in one of said opposite directions is about 0.020 inches.

17. The apparatus of claim 13 wherein said apparatus also includes a wall at each of said links extending normal to said flanges with each said wall terminating at one edge adjacent to one of said flanges and adjacent to said first end portion of one of said links.

18. The apparatus of claim 17 wherein said apparatus also includes a chain guide for effectively enclosing said chain when in said chain guide with said chain guide having an opening therein adjacent to said one edge of said wall of each of said links, and wherein said flanges when in said chain guide extend from said one edge of said wall of each of said links and from said first end portion of each of said links through said opening in said chain guide into said second path for engagement of the articles in said second path.

19. The apparatus of claim 13 wherein the articles to be conveyed have a neck portion with a neck ring thereat having a lower surface, and wherein said flanges engage said lower surface of said neck rings at said second path to support said articles during conveyance.

20. A conveying apparatus for conveying articles having a neck portion with a neck ring thereon, said apparatus comprising:

- a chain having a plurality of links each of which includes, when vertically positioned, first and second end portions having flat horizontal surfaces with vertically extending contoured side walls and with said first and second end portions being apertured for receiving a vertically extending linking pin therebetween, and a vertically extending cylindrical body portion horizontally offset from said first and second end portions with said cylindrical body portion having an aperture therethrough for receiving a vertically extending second linking pin;
- a flange associated with each of said links with each said flange extending horizontally from the bottom of each said link of said chain when said chain is vertically positioned, each said flange having an article engaging portion, and said flanges of adjacent links of said chain being at least partially spaced from one another; and
- a chain guide effectively enclosing said chain when in said chain guide and establishing the path of movement of said chain, said chain guide, when positioned to effectively enclose a vertically positioned chain within said chain guide, having parallel upper and lower guide walls adjacent to said flat horizontal surfaces of said first and second end portions of said links of said chain and parallel inner and outer guide walls adjacent to said vertically extending contoured side walls of said first and second end portions of said links of said chain, said outer wall of said chain guide having a horizontally extending opening thereat, and said flanges when in said chain guide extending through said opening at said outer guide wall of said chain guide into an article conveying path for engagement of said article engaging portions of said flanges with the neck rings of the articles whereby the articles are conveyed in a straight path along said article conveying path upon movement of said chain in a straight path along said chain path established by said chain guide and whereby the articles are conveyed in a curved path along said article conveying path upon movement of said chain in a curved path along said chain path with angular deviation between adjacent ones of said flanges in opposite directions toward away from one another causing said chain path to be curved in either one of said opposite directions depending upon the desired direction of curvature of said chain and article conveying paths.

* * * * *